(12) United States Patent
Kim et al.

(10) Patent No.: US 7,299,361 B1
(45) Date of Patent: *Nov. 20, 2007

(54) REMOTE E-MAIL SCANNING SYSTEM AND METHOD

(75) Inventors: Do K. Kim, Portland, OR (US); Christopher L. Pearce, Portland, OR (US); Jeffrey J. Constantine, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 391 days.

This patent is subject to a terminal disclaimer.

(21) Appl. No.: 10/756,682

(22) Filed: Jan. 12, 2004

Related U.S. Application Data

(63) Continuation of application No. 09/478,944, filed on Jan. 6, 2000, now Pat. No. 6,701,440.

(51) Int. Cl.
*G06F 11/30* (2006.01)
*G06F 17/30* (2006.01)
*G06F 11/00* (2006.01)

(52) U.S. Cl. ............... 713/188; 713/154; 713/165; 726/2; 726/3; 726/4; 726/24; 709/223; 709/224; 709/225; 709/226

(58) Field of Classification Search ............ 713/165; 726/2, 24, 4
See application file for complete search history.

(56) References Cited

U.S. PATENT DOCUMENTS 5,623,600 A * 4/1997 Ji et al. .................. 726/24
5,832,208 A * 11/1998 Chen et al. ................ 726/24
5,842,002 A * 11/1998 Schnurer et al. ............ 703/21
6,321,267 B1 * 11/2001 Donaldson ................ 709/229
6,654,787 B1 * 11/2003 Aronson et al. ........... 709/206
6,701,440 B1 * 3/2004 Kim et al. .................. 726/24
6,711,608 B1 * 3/2004 Ogilvie ..................... 709/206

OTHER PUBLICATIONS

Walker, Oct. 26, 1998, PC WEEK, 18(1).*

* cited by examiner

*Primary Examiner*—Taghi Arani
*Assistant Examiner*—Jenise E. Jackson
(74) *Attorney, Agent, or Firm*—Zilka-Kotab, PC; Christopher J. Hamaty

(57) ABSTRACT

A system and method are provided for protecting a user computer. An incoming e-mail message is initially received at a remote e-mail server over a network. Further, the incoming e-mail message is blocked if a sender address associated therewith is included in a list of predetermined sender addresses corresponding to a user computer. Moreover, the incoming e-mail message is scanned for a virus to determine that the incoming e-mail message is clean if the scanning fails to detect a virus in the incoming e-mail message and to determine that the incoming e-mail message is infected in the scanning detects a virus in the incoming e-mail message. Still yet, the incoming e-mail message is transmitted from the remote e-mail sever to the user computer over the network, if it is not blocked. An attempt is made to clean the infected incoming e-mail message if the scanning detects a virus in the incoming e-mail message to generate a cleaned e-mail message if the attempt to clean is successful. In use, a text message is transmitted to the user computer, indicating results of the scanning.

21 Claims, 5 Drawing Sheets

REMOTE E-MAIL SCANNING SYSTEM AND METHOD

RELATED APPLICATION(S)

The present application is a continuation of a parent application filed Jan. 06, 2000 under Ser. No. 09/478,944 now U.S. Pat. No. 6,701,440, which is incorporated herein by reference in its entirety.

BACKGROUND OF THE INVENTION

Field of the Invention and Description of Related Art

The present invention relates generally to a virus detection system. More specifically, a system and method for protecting a computer system by using a remote e-mail virus scanning device are disclosed.

Since 1987, when a virus infected ARPANET (Advanced Research Projects Agency Network), a large network used by the Defense Department and many universities, many antivirus programs have become commercially available for installation on computer systems and/or servers. Generally, a virus is a manmade destructive computer program or code that is loaded onto the computer system without the knowledge of the user and runs against the user's wishes and/or knowledge. Most viruses can replicate themselves and a simple virus that can replicate itself over and over is relatively easy to generate. However, even a simple virus can be dangerous as the virus can quickly use much or all of the available memory and possibly bring the computer system to a halt. A particularly dangerous type of virus is one that is capable of transmitting itself across networks and bypassing security systems.

One common type of virus is a macro virus which is encoded as a macro embedded in a document. Many applications, such as Microsoft Word® and Microsoft Excel®, support macro languages which allow the user to embed a macro in a document and have the macro execute each time the document is opened. Once a computer system is infected with a macro virus, the macro virus can embed itself in all future documents created with the associated application.

Another common virus is a master boot record ("MBR") virus which replaces the computer system's MBR with its own code. The MBR is a small program executed each time a computer boots. Typically, the MBR resides on the first sector of the computer hard disk. Since the MBR executes every time a computer is started, the MBR virus can be very dangerous to the integrity of the computer system. The MBR virus typically enters the computer systems through a floppy disk that is installed in the floppy drive when the computer system is started up. The floppy disk can infect the MBR even if the floppy disk is not bootable.

Worms is another example of a virus although some distinguish between viruses and worms. Worms typically refer to a type of virus that can replicate itself and use memory but cannot attach itself to other programs.

Another type of a destructive program is a Trojan horse which masquerades as a benign application. Unlike typical viruses, Trojan horses do not replicate themselves but can be just as or more destructive. One example of a type of Trojan horse is a program that purports to rid one's computer system of viruses but instead introduces viruses onto the computer system. The term "Trojan horse" comes from a story in Homer's Iliad in which the Greeks gave a giant wooden horse to their enemies, the Trojans, ostensibly as a peace offering. However, after the Trojans bring the horse inside their city walls, the Greek soldiers hidden inside the hollow belly of the wooden horse sneak out of the horse and open the city gates to allow their Greek compatriots to come enter and capture Troy.

It is noted that the term "virus" generally and broadly refers to any destructive or harmful program or code. As used herein, the term virus includes, among others, worms and Trojan horses.

As noted, many antivirus programs have become commercially available for protection against viruses. The antivirus program is typically a utility that searches a hard disk for viruses and removes any that are found. The antivirus program may periodically check the computer system for the best-known types of viruses. Most antivirus programs include an auto-update feature that enables the antivirus program to download profiles of new viruses so that the antivirus program can check for new viruses soon after the new viruses are discovered.

Currently, one of the most popular ways to infect computer systems with viruses is via electronic mail or e-mail message, particularly with e-mail attachments having viruses embedded therein. Such an e-mail attachment is typically an executable file which performs some task, such as a video and/or audio display, and may not appear to contain a virus. However, upon the opening of the e-mail attachment, for example, the computer system becomes infected with the virus.

E-mail has become an extremely popular method of communication, for both business purposes and personal purposes, such as forwarding of various information, documents, and/or executable programs. Many computer users have e-mail accounts through their employers. In addition, many computer users may also have e-mail accounts through an Internet application service provider (ASP), such as YAHOO and HOTMAIL, that provide web-based e-mail application services. Internet ASPs are third-party entities that manage and distribute software-based services and solutions to customers via the Internet from a central data center. ASPs that provide web-based e-mail application service typically maintain each user's e-mail box contents on its servers while the users may download attachments or executable programs to the user's computer systems for access, execution, and/or manipulation. Further, many computer users may also have e-mail accounts through an Internet service provider (ISP) that typically include e-mail services with subscriptions to Internet access.

Some companies that provide e-mail services offer them in combination with virus detecting services. For example, Microsoft Hotmail, an ASP, offers web-based e-mail services with optional delivery of virus protection or anti-virus software service for protecting the computer systems of its members from viruses received via file attachments. In particular, Hotmail's members have the option to scan e-mail attachments with the virus protection software prior to downloading the attachments. According to Microsoft, this option is available to members regardless of the operating system or the geographic location of the member's computer system and addresses e-mail attachments other than in-line graphics presented within the message text. The anti-virus software may be equipped with an automatic repair function for cleaning virus infections.

U.S. West, an ISP, also offers web-based e-mail services with optional virus detection with U.S. WEST Anti-Virus® to its U.S. WEST.net® Internet access subscribers. U.S. WEST Anti-Virus automatically scans e-mail attachments for viruses prior to delivering the e-mail message to the subscriber's in-box. According to U.S. West, the U.S. West Anti-Virus software is continually updated with emergency response to virus outbreaks to ensure provision of up-to-date virus protection. Such a web-based anti-virus e-mail service is provided via a centrally controlled server-based virus and malicious code protection and enables Internet-based security services.

However, an e-mail user must subscribe to the specific web-based e-mail service and access e-mail messages from that specific web-based e-mail service in order to receive e-mail protection service. The e-mail user must log-in or otherwise access and retrieve his/her e-mail messages from the mailbox stored on a server of that web-based e-mail service provider.

Furthermore, with the recent outbreaks of e-mail borne viruses and especially in e-mail attachments, it is desirable to provide a system and method to prevent the outbreak of the virus while the e-mail message is in transit before the e-mail message reaches the end user at a destination e-mail address.

SUMMARY OF THE INVENTION

A system and method are provided for protecting a computer. An incoming e-mail message is initially received at a remote e-mail server over a network. Further, the incoming e-mail message is blocked if a sender address associated therewith is included in a list of predetermined sender addresses corresponding to a user computer. Moreover, the incoming e-mail message is scanned for a virus to determine that the incoming e-mail message is clean if the scanning fails to detect a virus in the incoming e-mail message and to determine that the incoming e-mail message is infected if the scanning detects a virus in the incoming e-mail message. Still yet, the incoming e-mail message is transmitted from the remote e-mail sever to the user computer over the network, if it is not blocked. An attempt is made to clean the infected incoming e-mail message if the scanning detects a virus in the incoming e-mail message to generate a cleaned e-mail message if the attempt to clean is successful. In use, a text message is transmitted to the user computer, indicating results of the scanning.

BRIEF DESCRIPTION OF THE DRAWINGS

The present invention will be readily understood by the following detailed description in conjunction with the accompanying drawings, wherein like reference numerals designate like elements, and in which.

DESCRIPTION OF SPECIFIC EMBODIMENTS

A system and method for a remote or network-based application service offering virus scanning, sniffing, or detecting of e-mail viruses prior to the e-mail messages arriving at the destination system or server are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
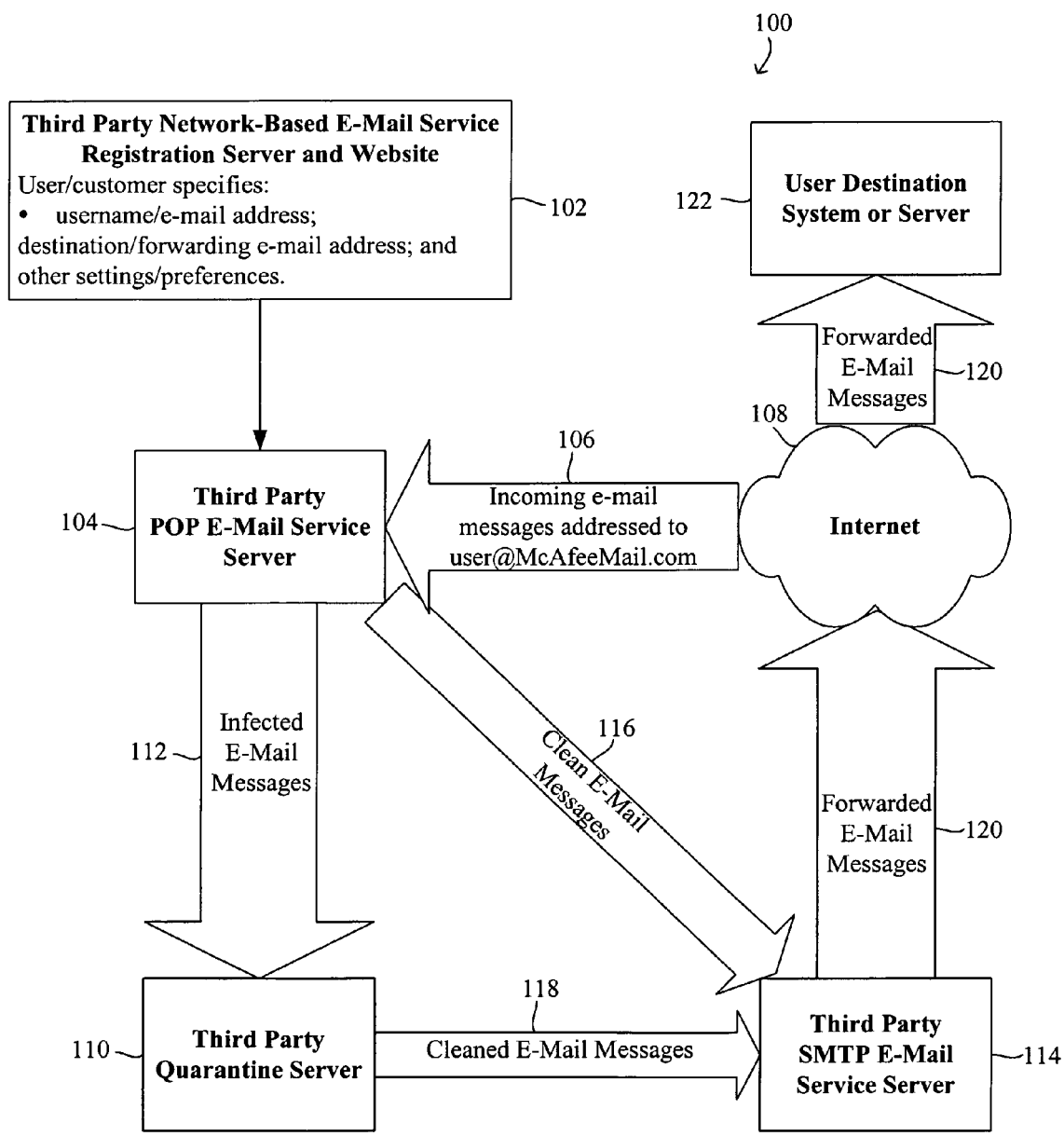
FIG. 1 is block diagram illustrating a system for a remote or network-based application service offering virus scanning of e-mail messages prior to the e-mail messages arriving at the destination system or server.

FIG. 1 is block diagram illustrating a system 100 for a remote or network-based application service offering virus scanning of e-mail messages prior to the e-mail messages arriving at the destination system or server. The system 100 is remote in that it is not integral with and is physically separate from the destination computer server or system and may be a third party system, for example. The system 100 generally comprises a network-based e-mail service registration server and website 102, a third-party POP e-mail service server 104 for receiving incoming e-mail messages 106 via the Internet 108, a third-party quarantine server 110 for receiving infected e-mail messages 112 from the POP server 104, and a third-party SMTP e-mail service server 114 for receiving clean e-mail messages 116 from the POP server 104 or cleaned e-mail messages from the quarantine server 110. The SMTP server 114 also forwards the clean and cleaned e-mails 120 to the destination server or system 122 via the Internet 108.

The e-mail virus-detection service system 100 generally allows a user to establish an account via the registration server 102 with a corresponding virus-detection e-mail address and various preference settings. The user may have e-mail messages addressed and sent to their virus-detection e-mail address. Upon receiving a user incoming e-mail message 106 via the Internet 108, the POP server 104 scans the incoming e-mail message, including its attachments, if any, for viruses. If the POP server 104 does not detect any viruses, the clean e-mail message 116 is forwarded to the SMTP e-mail service server 114. Alternatively, if the POP server 104 does detect one or more viruses, the infected e-mail message 112 is forwarded to the quarantine server 110 for processing. The quarantine server 110 cleans the infected e-mail message of the virus(es), if the infected e-mail message can be cleaned, and forwards the cleaned e-mail message 118 to the SMTP e-mail service server 114. The SMTP e-mail service server 114 in turn forwards the e-mail message 120 it received to the destination server or system 122 via the Internet 108 using the user's forwarding address as specified by the user.

As is evident, the e-mail virus-detection system 100 preferably does not maintain each user's mailbox contents but rather forwards each incoming e-mail message that is clean or cleaned to the user's specified e-mail forwarding address. In other words, upon forwarding the clean or cleaned e-mail message by the SMTP server 114, the system 100 preferably automatically removes the e-mail message from its memory. Such a configuration thus minimizes or reduces the memory and storage requirements of the system 100.

When used by a corporate user, the e-mail virus-detection system 100 acts as a gateway located outside of a corporate firewall. From the corporate point of view, e-mail messages are processed entirely over the Internet by a third party and the third party e-mail virus-detection system 100 prevents an infected e-mail message from entering the corporate environment or domain, either by first cleaning the infected e-mail message or by not forwarding the infected e-mail message to the destination server or system.

Figure 2:
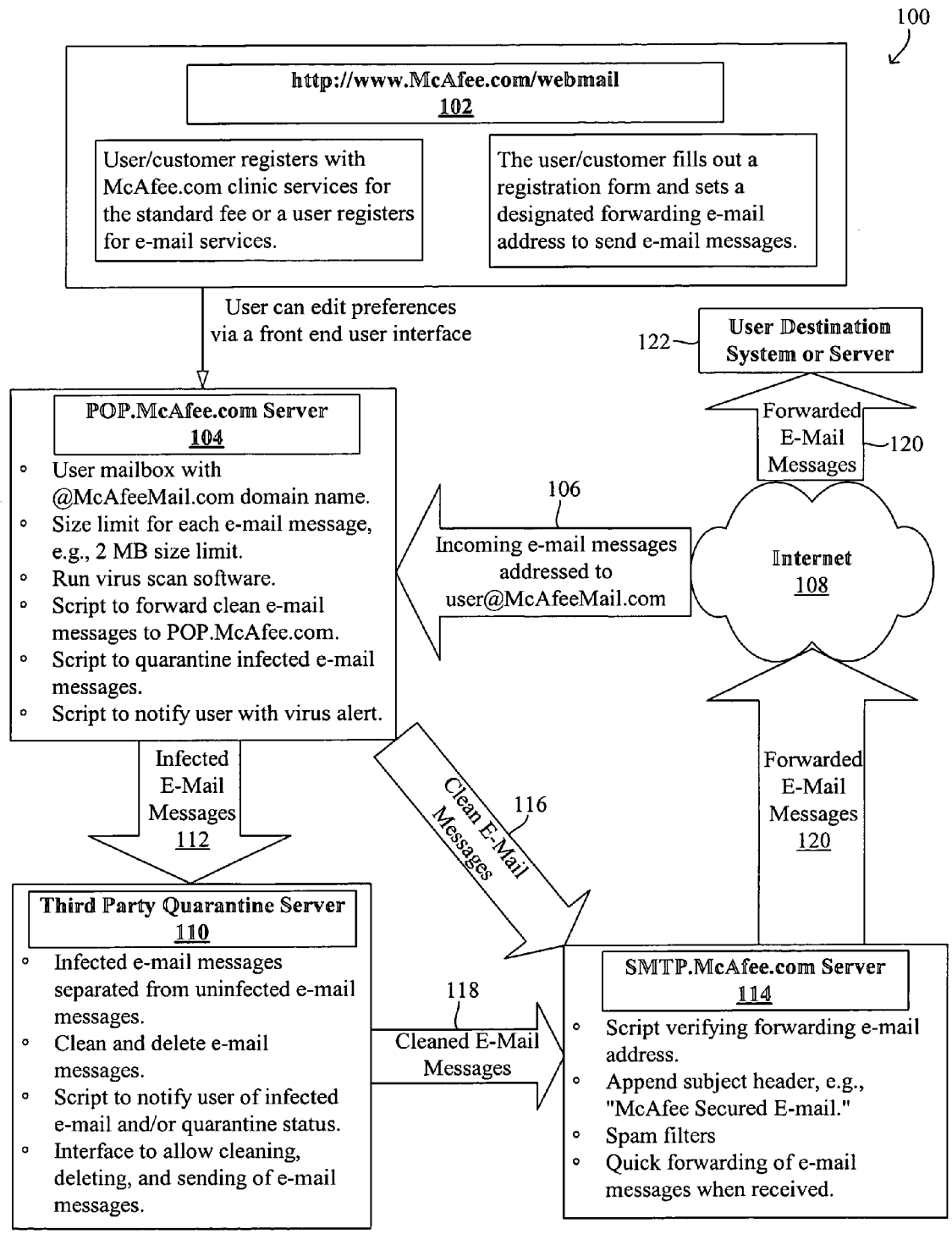
FIG. 2 is a more detailed block diagram illustrating an example of one implementation of the system of FIG. 1.

FIG. 2 is a more detailed block diagram illustrating an example of one implementation of the system of FIG. 1. Each of the components of the network-based application service system 100 will now be described in more detail below with reference to FIGS. 1 and 2.

Network-Based E-Mail Service Registration Server 102

The network-based e-mail service server 102 preferably maintains a user profile for each of its users and/or user accounts. Each user profile would typically include, for example, the username, the password required to access the user's account, the forwarding e-mail address(es), conditions or rules for forwarding of e-mail messages, course of action for infected e-mail messages that the system is unable to clean, any other suitable settings, and/or any combination thereof. As is evident, the user may access and/or modify his user profile with the username and password after initially establishing the account.

The network-based e-mail service registration server and website 102 allows a new user or customer to register for the e-mail virus detection service and to specify the desired username and virus detection e-mail address, as well as the destination or forwarding e-mail address. The e-mail virus detection system 100 may allow specification of multiple forwarding e-mail addresses such that e-mail messages from certain specified senders are optionally forwarded to one forwarding e-mail address while the remainder of the e-mail messages are optionally forwarded to another forwarding e-mail address, for example.

The network-based e-mail service registration server and website 102 also allows the user in setting or altering the user's settings, preferences, and/or specifications. In addition, the server 102 preferably provides default settings for settings that need not be unique to each user or account. An example of a user setting is the desired subject line of the e-mail message forwarded to the forwarding e-mail address. The desired subject line of the forwarded e-mail message may be different for clean e-mail messages and for previously infected and cleaned e-mail messages so as to identify that the e-mail message had to be cleaned of virus(es). For example, the user may specify that the forwarded clean e-mail message be identified with "Forwarded from McAfeeMail.com" or simply to reflect it was forwarded while retaining the original subject header, if any. In addition, the user may specify that the forwarded previously infected and cleaned e-mail message be identified with "Cleaned by McAfeeMail.com" or simply to reflect it was forwarded while retaining the original subject header, if any. The text message may be inserted, for example, at the beginning of or appended at the end of the original subject header, if any.

Another example of a user setting is a listing of sender addresses to be blocked. Blocking a sender's address results in all e-mail messages from the blocked sender to be automatically deleted without being inspected for viruses or forwarded to the user. Alternatively, the user may specify that all e-mail messages are to be scanned for viruses or the system may be default scan all e-mail messages for viruses. If no virus is detected in an e-mail message from a blocked sender, the e-mail message is automatically deleted without being forwarded. On the other hand, if a virus is detected in an e-mail message from a blocked sender, the e-mail message may be cleaned, if possible, and either forwarded to the sender or a notification e-mail message is sent to the user notifying the user that an infected e-mail message was received from the blocked sender for purposes of notifying or warning the user of potentially infected e-mail messages from a certain sender.

Yet another example of a user setting is specification of whether the forwarded e-mail message lists the original sender or the e-mail virus-detection service provider as the sender of the forwarded e-mail message. Listing the original sender as the sender of the forwarded e-mail message allows the recipient user to respond to the original sender of the e-mail message by simply replying to the e-mail message rather than possibly performing extra steps of identifying and then addressing the response of the desired recipient. Listing the e-mail virus-detection service provider allows the recipient user to easily and more securely identify those e-mail messages sent or forwarded by the third party e-mail virus-detection service provider prior to opening of the e-mail message. Such a setting may facilitate in reducing the risk of an infected e-mail message masquerading as a clean or cleaned e-mail message from the e-mail virus-detection service provider, such as by inserting or appending the text message inserted by the anti-virus e-mail service.

Another example of a user setting is specification of the course of action when an infected e-mail message cannot be cleaned. For example, one course of action may be to delete the e-mail message or the infected portion of the e-mail message, such as the infected e-mail attachment. Additionally or alternatively, a notification may be sent to the user, preferably via an e-mail message addressed to the destination or forwarding e-mail address, that an infected e-mail message was received and could not be cleaned along with information regarding the infected e-mail messages such as the original sender and the original subject heading of the infected e-mail message.

Another course of action may be to hold the infected e-mail message and to notify the user that an infected e-mail message cannot be cleaned and is being held for the user. The infected e-mail message may be held for an indefinite or predefined period of time. The virus-detecting e-mail service provider may limit the cumulative size of all held infected e-mail messages for each user. For infected e-mail messages held by the e-mail service provider, the user may access his account at the registration server via the registration website to specify the course of action.

The user may choose to delete the infected e-mail message, specify an address to which to forward the infected e-mail message, allow the infected e-mail message to remain in the quarantine server 110, or request the service provider to attempt to clean the infected e-mail message again. For example, the virus protection software program may utilize heuristics to detect viruses that are not yet known. In addition, the virus protection software program may be able to identify and detect known viruses even before a cleaning method becomes available, such as may be the case for new viruses. The virus protection software may be updated when a cleaning method for such a virus becomes available at a later time. Further, for an e-mail message which the virus protection software may not be able to scan, such as certain encrypted e-mail messages, the e-mail message may be also be quarantined, for example, until the virus protection software is updated so as to be able to scan the message. Thus, allowing the infected e-mail message to remain in the quarantine server 110 allows additional attempts to clean the infected e-mail message after the virus protection software is updated. In one embodiment, the virus-detecting e-mail service system may attempt to clean all infected e-mail messages held in the quarantine server 110 after each virus protection software update.

To ensure that the forwarded e-mail message is indeed from the service provider and to ensure security of the e-mail message during delivery via the Internet from the SMTP server, PGP (pretty good protection) encryption may be utilized to encrypt the e-mail message forwarded by the system 100. PGP is one common way to protect messages on the Internet and is based on the public-key method, utilizing two keys. One key is a public key that the user disseminates to those from whom the user wants to receive e-mail messages, i.e., the anti-virus e-mail service provider in the present case. The other key is a private key that the user uses to decrypt the messages the user receives.

A VPN (virtual private network) may additionally or alternatively be utilized in order to ensure the security of the e-mail messages being delivered. The VPN ensures that only authorized users can access the network and reduces the risk of data being intercepted. Furthermore, the user may utilize a secured NIC (network interface card). The e-mail message checks the identification of the NIC at the recipient end to ensure it has reached the correct destination, thereby preventing an unauthorized user from sniffing or stealing the data contained in the e-mail message.

POP E-Mail Service Server 104

After a new user account is created via the service registration server 102, the POP e-mail service server 104 may begin receiving incoming e-mail messages 106 on behalf of the user. All incoming e-mail messages 106 received by the POP e-mail server 104 on behalf of a given user via the Internet 108 are addressed to the e-mail address of the user at the virus-detection e-mail service provider POP server address. For example, the e-mail address may be JohnDoe@McAfeeMail.com where JohnDoe is the username and McAfeeMail.com is the POP server address for incoming mail.

The POP e-mail server 104 may impose a limit on the size of each incoming e-mail message, such as a 2 megabyte size limit. Thus, any e-mail message, including its attachments, if any, that is larger than the size limit is automatically rejected by the POP server and deemed undeliverable. The message may be rejected and sent back to the original sender with the size limit as the reason for the error or non-delivery. Preferably, the e-mail messages, including any attachments, are examined for viruses at the POP server although the e-mail message may be examined for viruses at another server, such as a virus detection server.

If the POP server 104 does not detect any viruses in the e-mail message, the POP e-mail server 104 preferably executes a script to forward the clean e-mail message directly to the SMTP server 114 of the virus detection or anti-virus e-mail service system 100. Alternatively, if the POP server 104 does detect a virus in the e-mail message, the POP e-mail server 104 preferably executes a script to quarantine the infected e-mail message by forwarding the infected e-mail message 112 to the quarantine server 110. The POP e-mail server 104 optionally executes the script to notify the user, such as with an e-mail message sent to the user's forwarding or destination e-mail address, that an infected e-mail message was received by the virus detection e-mail service system 100 on the user's behalf. This script may alternatively be executed by the quarantine server 110 as discussed below.

Quarantine Server 110

The quarantine server 110 receives all e-mail messages 112 determined to be infected by the POP server 104. One purpose of the quarantine server 110 is to separate infected e-mail messages from uninfected e-mail messages so as to not slow down the POP server 104. The quarantine server 110 also includes an interface to allow cleaning, deleting, and/or sending of notification e-mail messages to the user. For example, the quarantine server 110 optionally executes a script to notify the user preferably via an e-mail message sent to the user's forwarding e-mail address that an infected e-mail message was received by the virus detection e-mail service system 100 on the user's behalf and/or that the infected e-mail message is quarantined.

quarantine server 110 performs the cleaning and/or deleting of all infected e-mail messages. Preferably, the quarantine server 110 attempts to clean all infected e-mail messages. If the quarantine server 110 cannot clean any portion of the infected e-mail message, the quarantine server 110 may, depending upon the particular settings of the corresponding user profile, delete the entire or an infected portion of the infected e-mail message, such as a particular attachment, for example. If the quarantine server 110 deletes any portion of the e-mail message, it preferably sends an e-mail message notifying the user that an infected e-mail message could not be cleaned, that the entire or an infected portion of the e-mail message was deleted, and relevant information regarding the infected e-mail message such as the e-mail address of the original sender, the subject heading of the e-mail message, the size of the e-mail message or the attachment deleted, the time the e-mail message was sent, and/or any other information as desired.

Alternatively, as discussed above, the quarantine server 110 may hold and store the infected e-mail message for the user and to notify the user that an infected e-mail message is being held for the user and/or to forward the uninfected portion of the e-mail message. The infected e-mail message may be held for an indefinite or a predefined period of time. A limit may be placed on the cumulative size of all infected e-mail messages stored at the quarantine server for each user such that once the limit is reached, all subsequently received infected e-mail messages that cannot be cleaned are automatically deleted. Alternatively, once the cumulative size limit of all infected e-mail messages stored by the quarantine server is reached, the infected e-mail messages that cannot be cleaned are automatically deleted on a first-in first-out basis.

Once the user is notified of the infected e-mail message held by the e-mail service provider, the user may access his account and choose to delete the infected e-mail message, specify an address to which to forward the infected e-mail message, allow the infected e-mail message to remain in the quarantine server 110, or request another attempt to clean the infected e-mail message, for example. In particular, if a subsequent attempt to clean an infected e-mail message is successful, the quarantine server 110 then forwards the cleaned e-mail message 118 to the SMTP server 114.

As the virus detection and cleaning software is continually updated with the discovery of new viruses, the quarantine server may automatically re-attempt to clean infected e-mail messages stored by the quarantine server each time the anti-virus software is updated such that newly cleaned e-mail messages may be forwarded to the destination e-mail address and automatically removed from the memory of the quarantine server 110.

SMTP E-Mail Server 114

The SMTP e-mail service server 114 receives clean e-mail messages 116 from the POP server 104 and cleaned e-mail messages 118 from the quarantine server 110. The SMTP (Simple Mail Transfer Protocol) is a protocol for sending e-mail messages between servers. Most e-mail systems that send mail over the Internet use SMTP to send messages from one server to another as well as to send messages from a mail client to a mail server. For example, the SMTP server 114 may utilize send mail, a Unix e-mail program, or Webscan®, which is another e-mail program that runs on Solaris and promulgated by Network Associates, Inc. Although SMTP is the preferred protocol, any other suitable mail protocol may be used.

The SMTP server 114 preferably includes a script for verifying the user's destination or forwarding e-mail address according to the corresponding user profile and a script for optionally inserting some text into the subject header of the e-mail message. For example, SMTP server 114 may insert "McAfee.com Secured E-Mail" into the subject header to indicate that the e-mail message was scanned by the service provider. In addition, the SMTP server 114, rather than the POP server 104, may execute a "spam" filter by automatically deleting spam e-mail messages from unsolicited senders. Such spam filters are common and known in the art. Furthermore, the SMTP server 114 preferably quickly forwards e-mail messages to the destination forwarding e-mail address as the SMTP server 114 receives clean and cleaned e-mail messages from the POP and quarantine servers 104, 110, respectively.

The servers of the system 100, such as the network-based e-mail service registration server 102, the POP e-mail service server 104, the quarantine server 110, and the SMTP e-mail service server 114, may be any number of actual physical servers. For example, a single actual server may be provided such that the single server is divided into multiple virtual servers. As is evident, any number of actual servers may collectively serve as the virtual servers of the system 100. The number of actual servers and the particular configuration of the actual servers and virtual servers may be determined according to various factors such as memory capacities and processing speeds of the actual servers and the memory and processing speed requirements of the virtual servers, for example. In addition, it may be desirable to assign the quarantine server to a separate actual server so as to minimize the risk of infecting the other servers of the system 100 with the viruses contained in the infected e-mail messages.

Figure 3:
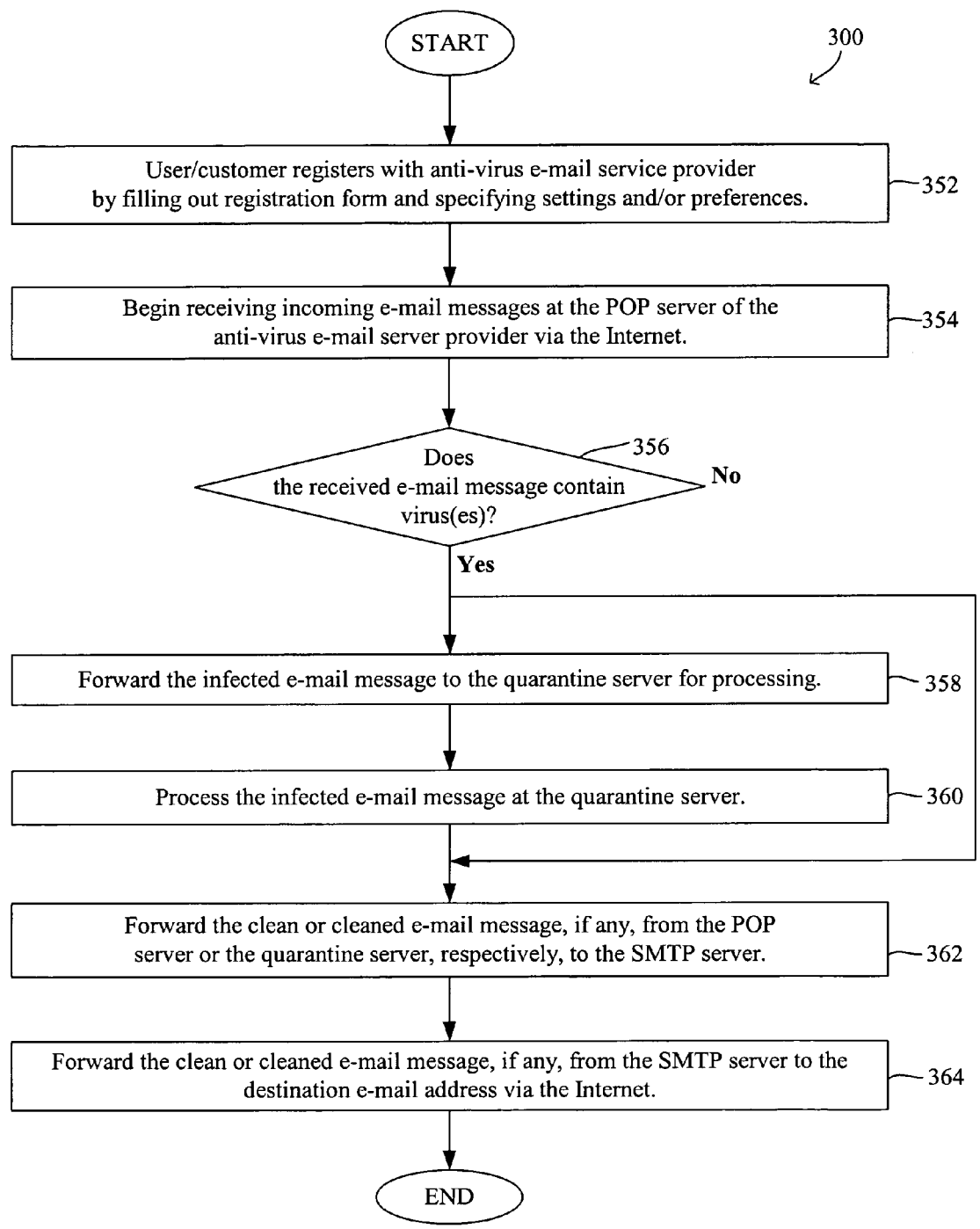
FIG. 3 is a flow chart illustrating an overall process of the network-based application service for scanning for viruses in e-mail messages prior to the e-mail messages arriving at the destination system or server.

FIG. 3 is a flow chart illustrating an overall process 300 of the remote or third-party, network-based application service for scanning for viruses in e-mail messages prior to the e-mail messages arriving at the destination system or server.

At step 352, the user or customer registers for the anti-virus e-mail service provider by filling out a registration form with the necessary information and specifying the settings and/or preferences. The user may be registered through a larger package as noted above such that the registration and setup step 352 may be part of a larger registration and setup process. Preferably, the anti-virus e-mail service provider provides defaults for many of the settings and/or preferences that need not be unique to each user. The information provided or specified by the user include username, password, destination forward e-mail address, and any applicable billing information, such as credit card information, for example, which must be specified by each user. Other information which may be specified by the user or set to default values may include course of action to be taken when an infected e-mail message cannot be cleaned, for example.

After the registration step is complete, the service provider system can begin receiving incoming e-mail messages addressed to the username specified by the user and sent via the Internet at step 354. At step 356, the POP server scans and determines whether each received e-mail message contains virus(es).

If the received e-mail message is infected with virus(es), the infected e-mail message is forwarded to the quarantine server at step 358. The quarantine server processes the infected e-mail message at step 360. If the infected e-mail message is cleaned, the cleaned e-mail message is forwarded to the SMTP server at step 362. Alternatively, if no virus is detected in the received e-mail message, the clean e-mail message is forwarded to the SMTP server at step 362. Finally, at step 364, the clean or cleaned e-mail message, if any, is forwarded from the SMTP server to the destination e-mail address via the Internet.

Figure 4:
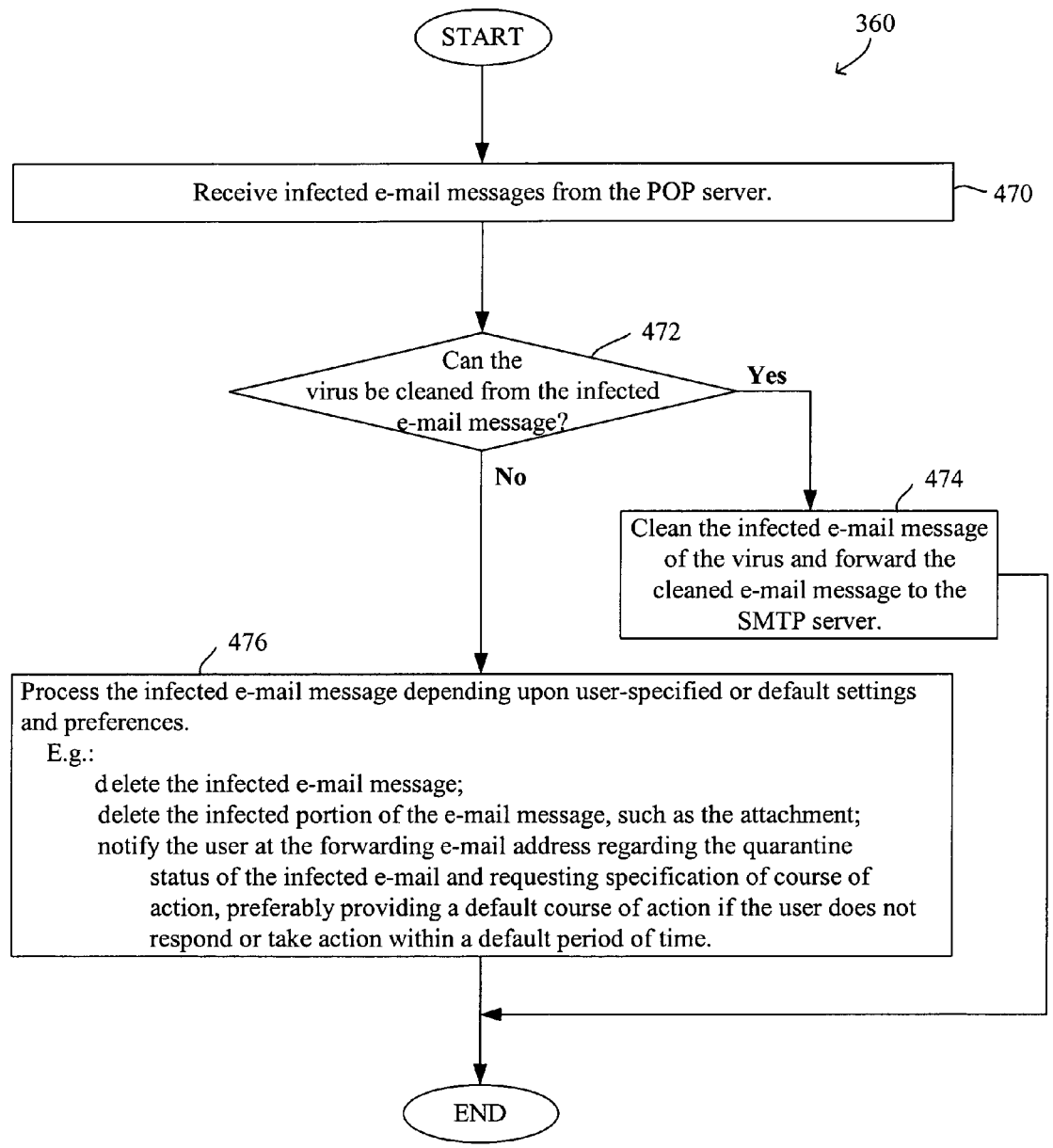
FIG. 4 is a flow chart illustrating the processing of an infected e-mail message at the quarantine server.

FIG. 4 is a flow chart illustrating the step 360 of processing an infected e-mail message at the quarantine server. At step 470, the infected e-mail message is received from the POP server. At step 472, the process determines if the infected e-mail message can be cleaned of the virus.

If the infected e-mail message can be cleaned, then the quarantine server cleans the infected e-mail message and forwards the cleaned e-mail message to the SMTP server at step 474. Alternatively, if the infected e-mail message cannot be cleaned, the quarantine server processes the infected e-mail message depending upon the user-specified or defaults settings and preferences, as discussed above. For example, the quarantine server may delete all or a portion of the infected e-mail message and/or notify the user of the quarantine status of the infected e-mail message and request the user to access his account to specify a course of action. Preferably, the service provider provides a default course of action, such as deleting the all or the infected portion of the e-mail message and forwarding the remainder uninfected portion to the designated forwarding address, if the user does not respond or take action within a default period of time.

Charging for Anti-Virus E-Mail Services

A user may be charged or billed for the usage of such a virus-detection e-mail forwarding service based on the number of e-mail messages, the cumulative size of either all e-mail messages or those e-mail messages over a certain threshold size, and/or on a time-based subscription. Alternatively, the service may be free while optionally requiring the user receive advertisements or spam. Other methods for charging for the virus-detection e-mail service may include discounts or free service for soliciting other users to sign up for the service and/or discounts or free service for signing up through a partner service, such as Internet access through an ISP partner of the e-mail service provider. In another scenario, the user may utilize such service by registering for a package such as the McAfee.com Clinic Services offered by McAfee.com, the assignee of the subject patent application, which includes the virus-detecting e-mail forwarding service.

Figure 5:
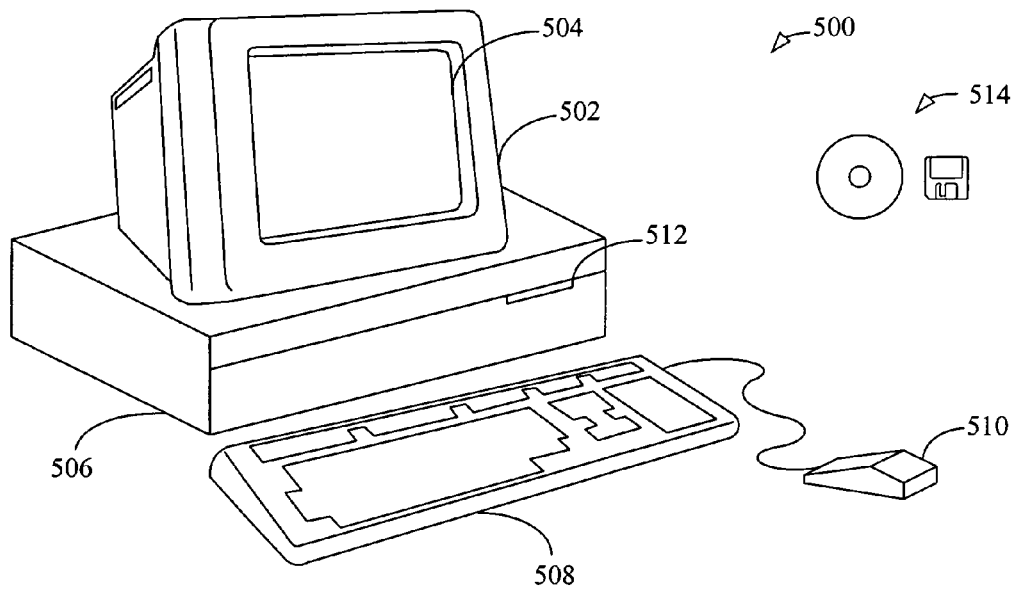
FIG. 5 illustrates an example of a computer system that can be utilized to execute the software of an embodiment of the invention and use hardware embodiments.

FIG. 5 illustrates an example of a computer system 500 that can be used to execute the software of an embodiment of the invention and use hardware embodiments. FIG. 5 shows a computer system 500 that includes a display or monitor 502, screen 504, cabinet 506, keyboard 508, and mouse 510. Mouse 510 can have one or more buttons for interacting with a graphical user interface (GUI). Cabinet 506 may house a CD-ROM and/or floppy disk drive 512, system memory, and a hard drive (see FIG. 6) which can be utilized to store and retrieve software programs incorporating computer code that implements aspects of the invention, data for use with the invention, and the like. Although CD-ROM and floppy disk 514 are shown as exemplary computer readable storage media, other computer readable storage media including tape, flash memory, system memory, and hard drive can be utilized. Additionally, a data signal embodied in a carrier wave (e.g., in a network including the Internet) can be the computer readable storage medium.

Figure 6:
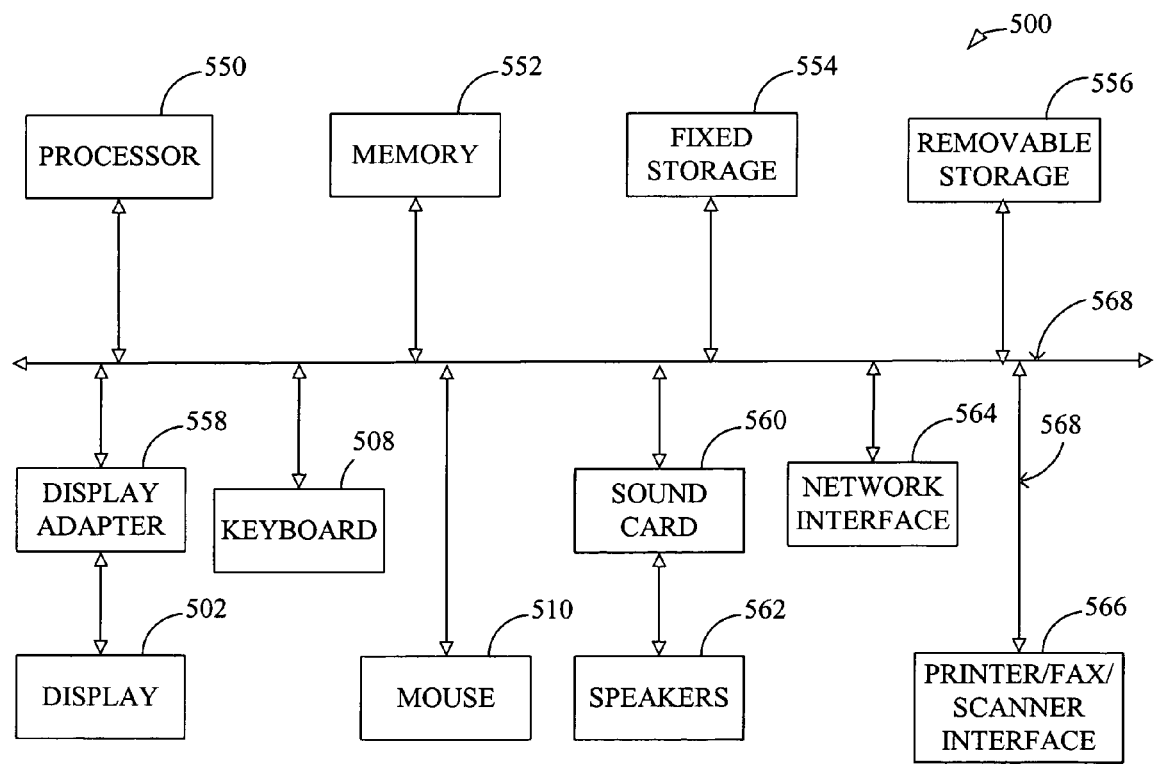
FIG. 6 is a schematic of a illustrates a system block diagram of the computer system of FIG. 5.

FIG. 6 shows a system block diagram of the computer system 500 used to execute a software of an embodiment of the invention or use hardware embodiments. As in FIG. 5, computer system 500 includes display 502 and keyboard 508, and mouse 510. Computer system 500 further includes subsystems such as a central processor 550, system memory 552, fixed storage drive 554 (e.g., hard drive), removable storage drive 556 (e.g., floppy disk and/or CD-ROM drive), display adapter 558 for interfacing with the display 502, sound card 560, transducers 562 (e.g., speakers, microphones, and the like), network interface 564, and/or printer/facsimile/scanner interface 566. Other computer systems suitable for use with the invention can include additional or fewer subsystems. For example, another computer system could include more than one processor 550 (i.e., a multi-processor system) and/or a cache memory.

The system bus architecture of computer system 500 is represented by arrows 568. However, these arrows are illustrative of any interconnection scheme serving to link the subsystems. For example, a local bus could be utilized to connect the central processor to the system memory and display adapter. Computer system 500 shown in FIG. 6 is but an example of a computer system suitable for use with the invention. Other computer architectures having different configurations of subsystems can also be utilized. A system memory and a hard drive of a computer system, whether the service provider computer system or the client computer, can be utilized to store and retrieve software programs incorporating computer code that implements aspects of the invention, data for use with the invention, and the like. Exemplary computer readable storage media include CD-ROM, floppy disk, tape, flash memory, system memory, hard drive, as well as a data signal embodied in a carrier wave (e.g., in a network such as the Internet).

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for protecting a user computer, comprising:
   receiving an incoming e-mail message at a remote e-mail server over a network;
   blocking the incoming e-mail message if a sender address associated therewith is included in a list of predetermined sender addresses corresponding to a user computer;
   scanning the incoming e-mail message for a virus to determine that the incoming e-mail message is clean if the scanning fails to detect a virus in the incoming e-mail message and to determine that the incoming e-mail message is infected if the scanning detects a virus in the incoming e-mail message;
   transmitting the incoming e-mail message from the remote e-mail server to the user computer over the network, if it is not blocked; and
   attempting to clean the infected incoming e-mail message if the scanning detects a virus in the incoming e-mail message to generate a cleaned e-mail message if the attempt to clean is successful;
   wherein a text message is transmitted to the user computer if the scanning detects the virus in the incoming e-mail message, indicating results of the scanning, the text message being included in the cleaned e-mail message if the attempt to clean is successful;
   wherein the text message is inserted in a subject header of the cleaned e-mail message, the text message being inserted at a beginning of the subject header of the cleaned e-mail message or appended at an end of the subject header of the cleaned e-mail message.

2. The method for protecting the user computer to claim 1, wherein the list is associated with a user profile corresponding to the user computer, the user profile requiring a username and a password to modify the list.

3. The method for protecting the user computer according to claim 1, further comprising deleting the incoming e-mail message from the remote e-mail server, if it is blocked.

4. The method for protecting the user computer according to claim 1, wherein at least an infected portion of the infected incoming e-mail message includes an attachment, and only deleting the attachment if it is infected.

5. The method for protecting the user computer according to claim 1, further comprising quarantining the infected incoming e-mail message to a remote quarantine server.

6. The method for protecting the user computer according to claim 1, further comprising deleting at least an infected portion of the infected incoming e-mail message after the attempt to clean the incoming e-mail message is unsuccessful.

7. The method for protecting the user computer according to claim 6, wherein the infected portion of the infected incoming e-mail message includes an e-mail attachment.

8. The method for protecting the user computer according to claim 7, wherein the deleting includes deleting the entire infected incoming e-mail message.

9. The method for protecting the user computer according to claim 1, further comprising storing the infected e-mail message in memory if the attempt to clean the incoming e-mail message is unsuccessful.

10. The method for protecting the user computer according to claim 9, further comprising performing the attempt to clean the infected incoming e-mail message at least once again after the storing.

11. A system for protecting a user computer, comprising:
   logic for receiving an incoming e-mail message at a remote e-mail server over a network;
   logic for blocking the incoming e-mail message if a sender address associated therewith is included in a list of predetermined sender addresses corresponding to a user computer;
   logic for scanning the incoming e-mail message for a virus to determine that the incoming e-mail message is clean if the scanning fails to detect a virus in the incoming e-mail message and to determine that the incoming e-mail message is infected if the scanning detects a virus in the incoming e-mail message;

logic for transmitting the incoming e-mail message from the remote e-mail server to the user computer over the network, if it is not blocked;

logic for attempting to clean the infected incoming e-mail message if the scanning detects a virus in the incoming e-mail message to generate a cleaned e-mail message if the attempt to clean is successful; and logic for transmitting a text message to the user computer if the scanning detects a virus in the incoming e-mail message, indicating results of the scanning, the text message being included in the cleaned e-mail message if the attempt to clean is successful;

wherein the text message is inserted in a subject header of the cleaned e-mail message, the text message being inserted at a beginning of the subject header of the cleaned e-mail message or appended at an end of the subject header of the cleaned e-mail message.

12. A computer program product embodied on a tangible computer readable medium for protecting a user computer; computer code receiving an incoming e-mail message at a remote e-mail server over a network; computer code for blocking the incoming e-mail message if a sender address associated therewith is included in a list of predetermined sender addresses corresponding to a user computer; computer code for scanning the incoming e-mail message for a virus to determine that the incoming e-mail message is clean if the scanning fails to detect a virus in the incoming e-mail message, and to determine that the incoming e-mail message is infected if the scanning detects a virus in the incoming e-mail message; computer code for transmitting the incoming e-mail message from the remote e-mail server to the user computer over the network, if it is not blocked; computer code attempting to clean the infected incoming e-mail message if the scanning detects a virus in the incoming e-mail message to generate a cleaned e-mail message if the attempt to clean is successful; and computer code for transmitting a text message to the user computer if the scanning detects the virus in the incoming e-mail message, indicating results of the scanning, the text message being included in the cleaned e-mail message if the attempt to clean is successful; wherein the text message is inserted in a subject header of the cleaned e-mail message, the text message being inserted at a beginning of the subject header of the cleaned e-mail message or appended at an end of the subject header of the cleaned e-mail message.

13. The computer program product for protecting the user computer according to claim 12, wherein the list is associated with a user profile corresponding to the user computer, the user profile requiring a username and a password to modify the list.

14. The computer program product for protecting the user computer according to claim 12, further comprising computer code for deleting the incoming e-mail message from the remote e-mail server, if it is blocked.

15. The computer program product for protecting the user computer according to claim 12, wherein at least an infected portion of the infected incoming e-mail message includes an attachment, and only deleting the attachment if it is infected.

16. The computer program product for protecting the user computer according to claim 12, further comprising computer code for quarantining the infected incoming e-mail message to a remote quarantine server.

17. The computer program product for protecting the user computer according to claim 12, further comprising computer code for deleting at least an infected portion of the infected incoming e-mail message after the attempt to clean the incoming e-mail message is unsuccessful.

18. The computer program product for protecting the user computer according to claim 17, wherein the infected portion of the infected incoming e-mail message includes an e-mail attachment.

19. The computer program product for protecting the user computer according to claim 18, wherein the deleting includes deleting the entire infected incoming e-mail message.

20. The computer program product for protecting the user computer according to claim 12, further comprising computer code for storing the infected e-mail message in memory if the attempt to clean the incoming e-mail message is unsuccessful.

21. The computer program product for protecting the user computer according to claim 20, further comprising computer code for performing the attempt to clean the infected incoming e-mail message at least once again after the storing.

* * * * *

UNITED STATES PATENT AND TRADEMARK OFFICE
CERTIFICATE OF CORRECTION

PATENT NO. : 7,299,361 B1
APPLICATION NO. : 10/756682
DATED : November 20, 2007
INVENTOR(S) : Kim et al.

It is certified that error appears in the above-identified patent and that said Letters Patent is hereby corrected as shown below:

In the claims:
Col. 12, line 21, replace "computer" with -- computer according --;
Col. 13, line 18, replace "embodied on a tangible computer readable medium for protecting a user" with -- for protecting a user computer comprising: --;
Col. 13, line 20, replace "code" with -- code for --;
Col. 13, line 33, replace "code" with -- code for --.

Signed and Sealed this

Thirtieth Day of November, 2010

David J. Kappos
*Director of the United States Patent and Trademark Office*